US012183525B1

(12) United States Patent
Palani et al.

(10) Patent No.: US 12,183,525 B1
(45) Date of Patent: Dec. 31, 2024

(54) PRESSURE ACTIVATED SWITCH

(71) Applicant: Halliburton Energy Services, Inc., Houston, TX (US)

(72) Inventors: Vinodh Kumar Palani, Singapore (SG); Ruchir Shirish Patwa, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/215,495

(22) Filed: Jun. 28, 2023

(51) Int. Cl.
*H01H 35/24* (2006.01)
*E21B 41/00* (2006.01)

(52) U.S. Cl.
CPC ............. *H01H 35/24* (2013.01); *E21B 41/00* (2013.01)

(58) Field of Classification Search
CPC ................. E21B 41/00; E21B 43/1185; E21B 43/11852; E21B 23/04; E21B 23/042; E21B 41/0085; E21B 34/066; G01V 11/002; H01H 35/24
See application file for complete search history.

(56) References Cited

U.S. PATENT DOCUMENTS 3,413,429 A * 11/1968 Yost ........................ E21B 43/12
200/83 Y
4,724,289 A 2/1988 Heissler
9,033,056 B2 5/2015 Acosta et al.
2009/0277687 A1* 11/2009 Lee ........................... E21B 4/18
175/57
2013/0026978 A1 1/2013 Cooley et al.
2016/0258257 A1* 9/2016 Babin ................... E21B 29/005
2016/0312559 A1 10/2016 Gotlib et al.
2021/0002981 A1 1/2021 Roessler
2021/0123325 A1* 4/2021 Church ................ H02K 7/1025
2022/0205358 A1 6/2022 Werkheiser et al.

FOREIGN PATENT DOCUMENTS

CN 211291834 U 8/2020

OTHER PUBLICATIONS

International Search Report & Written Opinion; PCT Application No. PCT/US2023/026537; mailed Mar. 20, 2024.
English Abstract of CN211291834 U; retrieved from www.espacenet.com on Mar. 21, 2024.

* cited by examiner

*Primary Examiner* — Kristyn A Hall
(74) *Attorney, Agent, or Firm* — NOVAK DRUCE CARROLL LLP

(57) ABSTRACT

Systems and methods for remotely closing a switch that is downhole in a wellbore are disclosed. The switch has a body with a first connector and a movable piston assembly with a second connector configured to mate with the first connector. The piston assembly has a first position wherein the first and second connectors are separated and a second position wherein the first and second connectors are mated. A spring is disposed between the body and the piston assembly and configured to urge the piston assembly toward the first position. When the fluid in the wellbore reaches a pressure above a threshold, the piston assembly will move to the second position thereby closing the switch.

20 Claims, 4 Drawing Sheets

PRESSURE ACTIVATED SWITCH

TECHNICAL FIELD

The present technology pertains to electrical switches adapted for use downhole in a well.

BACKGROUND

Completion and operation of a petroleum well often involves logging-while-drilling (LWD) or evaluation of the wellbore using an electrically powered instrument. The power source, e.g., a battery, may be part of the instrument or provided as a separate battery insert coupled into the drill string. It takes a significant amount of time to assemble the drill string with the instrument and battery and lower it into the wellbore. As the battery must be connected to the instrument on the surface as the drill string is being assembled, the power source begins to be depleted long before the instrument is in position to collect data. In addition, the power supply may provide high-voltage power, e.g., several hundred volts, and the electrical leads of the power source may be exposed at the surface while the drill string is being assembled, thereby exposing workers to a risk of electrocution if they inadvertently come into contact with an exposed lead while handling the drill string.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
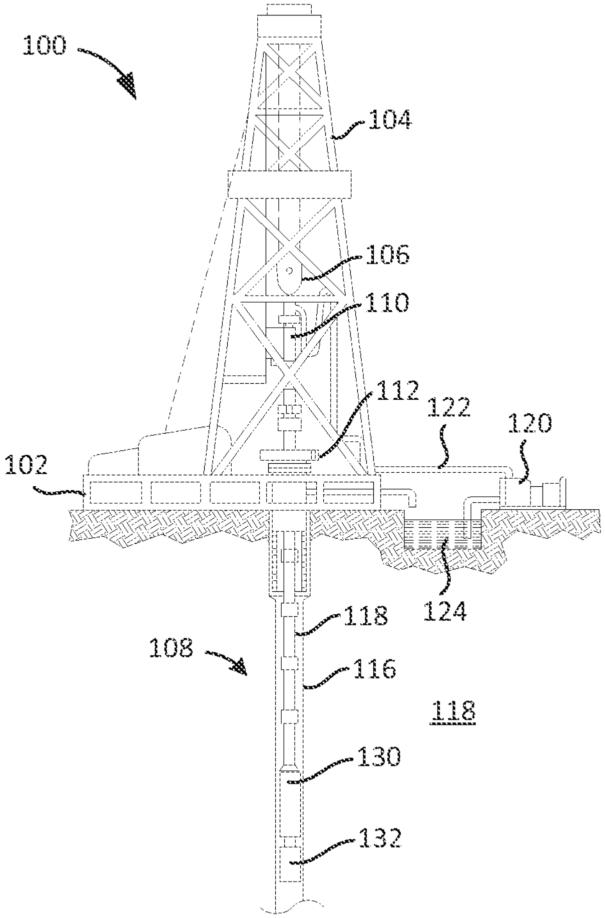
FIG. 1 depicts a drilling arrangement in schematic form, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Power to an electrically powered downhole instrument is often provided by a battery insert that is coupled into the drill string proximate to the instrument. Connection of the battery pack to the instrument is conventionally performed as a last operation at the surface while the battery insert is being coupled to the drill string. As the instrument may need to be lowered thousands of feet, even miles, into the well bore, it takes a significant amount of time to incrementally assemble the drill string. As a consequence of connecting power at the surface, the power source begins to be depleted long before the instrument is in position to collect data.

In addition, the power supply may provide high-voltage power, e.g., several hundred volts, and the electrical leads of the power source may be exposed at the surface while the drill string is being assembled, thereby exposing workers to a risk of electrocution if they inadvertently come into contact with an exposed lead. Thus, conventional methods of connecting power from a source to an instrument reduce the operational life of the instrument and pose a risk of injury to works on the drill ring.

The disclosed technology addresses the foregoing by providing systems and methods of connecting power between a power source and an instrument while the power source and instrument are disposed downhole. A fluidically operated switch is integrated into the battery insert or other location on the drill string functionally disposed between the battery insert and instrument. The disclosed switch is a "normally open" design that is open when assembled into the drill string at the surface; thus, the inherent exposure of workers to a high voltage is eliminated. The switch is closed by the application of pressurized fluid, e.g., drilling mud, introduced into the drill string from the surface and the pressure at the switch rises above above a threshold. This eliminates the power draw while the instrument is being lowered into its operational position in the well bore, thus extending the life of the instrument. The switch remains "closed" while the fluid pressure is above a threshold. After use of the instrument is completed, the reduction in fluid pressure inherent in removing the drill string and instrument from the wellbore allows the switch to return to its open position, thus avoiding the need for workers to manually disconnect power at the surface and again eliminating the inherent exposure to a high voltage.

As used within this disclosure, the term “mated” means that two electrical conductors are in conductive contact such that electric current can flow between the conductors.

As used within this disclosure, the term “spring” includes any component that applies a force to an object. The force may be approximately constant or variable, e.g, proportional to compression. This includes conventional mechanical springs, e.g., a coil spring as shown herein, but also functionally equivalent apparatus, e.g., a compressible fluid reservoir, a compressible solid, a magnet, or an electrical solenoid.

As used within this disclosure, the phrase “compressing the spring” or similar includes deforming the coil spring as shown herein as well as other means of displacing or deforming the spring in a direction opposite the direction of the force created by the spring.

As used within this disclosure, the phrase “high voltage” means a voltage that poses a health risk to an individual if the voltage is applied across any parts of the body. This includes voltages above 30 volts root-mean-square (RMS) for an alternating current (AC) source and above 40 volts for a direct current (DC) source.

As used within this disclosure, the term “tool” includes any device, e.g., a battery or “battery insert” or fuel cell, that provides power to other tools as well as instruments or other devices that include a power source, e.g., an internal battery.

FIG. 1 depicts a drilling arrangement 100 in schematic form, in accordance with various aspects of the subject technology. A drilling platform 102 is equipped with a derrick 104 that supports a hoist 106 for raising and lowering a drill string 108 within a wellbore 116 through substrate 118. The hoist 106 suspends atop drive 110 suitable for adding drill pipe sections 118 to the drill string 108 as well as raising and lowering the drill string 108 through a well head 112. In this example, an instrument 132 is connected to the lower end of the drill string 108. In this example, a tool 130, e.g., a battery pack, is disposed adjacent to the instrument 132 and connected so as to provide power to the instrument 132. A pump 120 circulates a drilling fluid, also referred to as “mud,” through a supply pipe 122 to top drive 110 and down through the interior of drill string 108. The drilling fluid returns to the surface via the annulus around drill string 108 and into a retention pit 124. The drilling fluid has multiple possible functions, e.g., serving as a communication medium, providing an ability to provide a pressurized fluid to a downhole tool, e.g., tool 130, and maintain the integrity of the wellbore 116.

Figure 2:
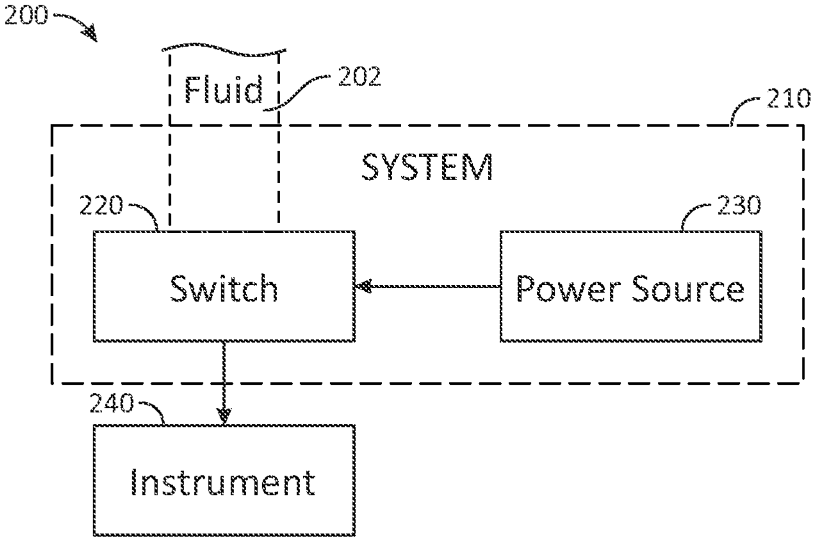
FIG. 2 illustrates a block diagram of an example system that incorporates a pressure-actuated switch, in accordance with various aspects of the subject technology.

FIG. 2 illustrates a block diagram 200 of an example system 210 that incorporates a pressure-actuated switch 220, in accordance with various aspects of the subject technology. The switch 220 is electrically coupled between a power source 230, e.g., a battery, and an instrument 240, e.g., a nuclear magnetic resonance (NMR) sensor, an LWD data recorder, or any other electrically powered device attached to the downhole portion of a drill string 108. In certain embodiments, the switch 230 is integral with, or attached to, the power source 230, e.g., attached to a battery insert that contains the power source. In certain embodiments, the switch 220 is integral with, or attached to, the instrument 240.

In certain embodiments, a pressurized fluid 202 is provided to the system 210, e.g., by the pump 120 through the drill string 108 of FIG. 1. In certain embodiments, the fluid 202 enters the power source 230 that is coupled to the drill string and then is directed to the switch 220. In certain embodiments, the fluid 202 is received directly by the switch 220.

Figure 3:
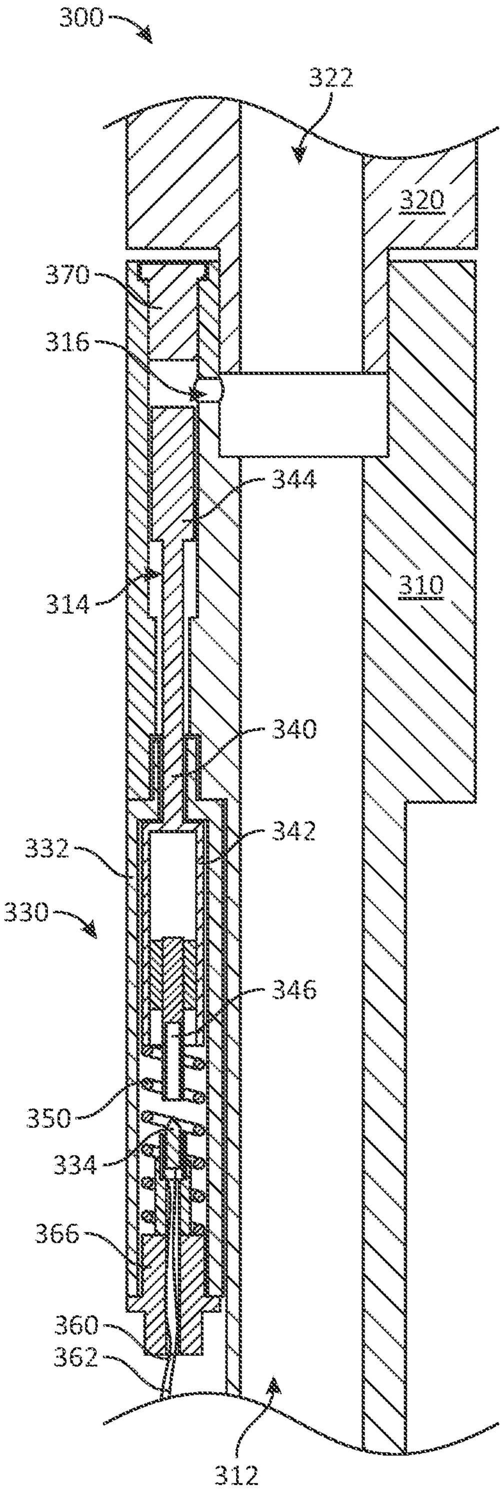
FIG. 3 illustrates a schematic view of an example pressure-actuated switch, in accordance with various aspects of the subject technology.

FIG. 3 illustrates a schematic view 300 of an example pressure-actuated switch 330, in accordance with various aspects of the subject technology. In this example, the switch 330 is attached to the housing 310 of a battery insert. In this example, the housing 310 is coupled to a drill pipe 320 as part of a drill string. The drill pipe 320 has an internal passage 322 that is fluidically coupled to an internal passage 312 of the battery insert housing 310. The housing 310 includes a compartment 314 that is fluidically coupled to the internal passage 312 through a passage 316.

A switch 330 is attached to the housing 310 and coupled to the compartment 314. The switch has a body 332 with a piston assembly 340 having a cartridge 342 slidably disposed within the body 332 and a piston 344 disposed external to the body 332. In certain embodiments, the body 332 comprises a removably coupled end cap 366. The body 332, in this example the end cap 366, comprises a first connector 334. The first connector 334 comprises a first contact electrically coupled to a first wire 360 and a second contact electrically coupled to a second wire 362. When the switch is coupled to the housing 310, the piston 344 is slidably disposed within the compartment 314. The cartridge 342 comprises a second electrical connector 346. The second connector 346 comprises two contacts that are electrically connected to each other. The second connector 346 is configured to slidably engage the first connector 334 such that the first contact of connector 334 engages one of the contacts of connector 346 and the second contact of connector 334 engages the other of the contacts of connector 346, thereby connecting the wires 360, 362. In certain embodiments, the first and second connectors 334, 346 are coaxial connectors.

The switch 330 also comprises a spring 350 disposed between the body 332, in this example the end cap 366, and the piston assembly 330 and configured to apply a force to the piston assembly 330 that urges the piston assembly 300 toward the “separated” position shown in FIG. 3

In this example, a sealing cap 370 is installed to close the compartment 314 from the external environment of the wellbore. In certain embodiments, the compartment 314 is provided by a structure that is separate from the housing 310, e.g., an attached cylinder (not shown in FIG. 3), that is fluidically coupled to the internal passage 312 through a functional equivalent to passage 316, e.g., a tube. In certain embodiments, the compartment 314 is part of the body 332 of the switch 330 (not shown in FIG. 3) and likewise fluidically coupled to the internal passage 312.

In certain embodiments, a seal, e.g., an O-ring, is provided between the piston 344 and the interior surface of compartment 314 (not visible in FIG. 3). The seal prevents fluid from flowing past the piston 344 within the compartment 314 such that introduction of the fluid at a pressure applies a force to the piston 344 that overcomes the force applied to the piston assembly 330 by the spring 350 and moves the piston assembly 330 downward, in the orientation of FIG. 3.

Figure 4:
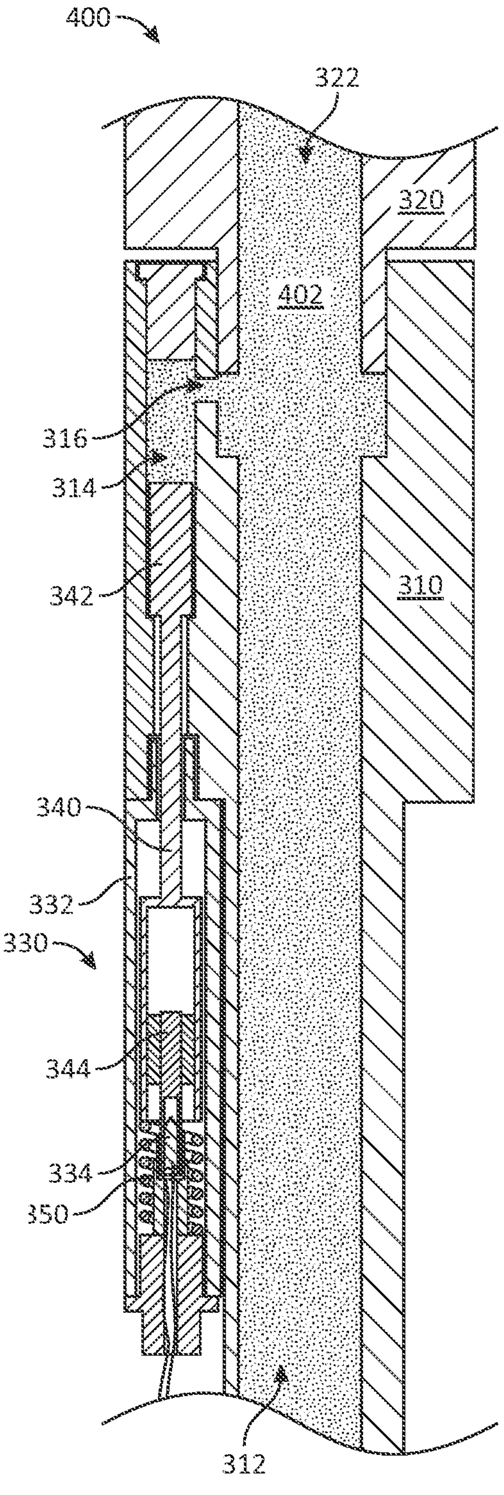
FIG. 4 illustrates the pressure-actuated switch of FIG. 3 while actuated, in accordance with various aspects of the subject technology.

FIG. 4 illustrates the pressure-actuated switch of FIG. 3 while actuated, in accordance with various aspects of the subject technology. A fluid 402, e.g., drilling mud, has been introduced into the internal passage 322 of drill pipe 320. The fluid 402 has passed into the inside passage 312 of tool 310 and through the passage 316 into compartment 314.

Thus, the pressure of the fluid in the compartment 314 is approximately the same as the pressure of the fluid in internal passage 312.

In certain embodiments, the fluid 402 is introduced into the drill string 108 as it is lowered into the wellbore 116. If the fluid 402 is not supplied with pressure by the pump 120, the hydrostatic head created by the column of fluid 402 within the wellbore will still create a pressure at the depth of the switch 330. In this manner, the switch 330 is automatically closed upon reaching a predetermined activation depth when the pressure created by the hydrostatic head exceeds the activation threshold pressure. Conversely, the switch 330 will open when the fluid pressure at the switch 330 drops below the activation threshold as the drill string 108 is raised from the wellbore. This eliminates the risk of omitting a safety-critical step in the midst of a complex operation.

Pressure of the fluid in the compartment 314 creates a force on piston 344, as the fluid contacts primarily the top (in the view of FIG. 3) of piston 344. If the fluid is at a pressure above a threshold, the force applied by the fluid overcomes the force applied by the spring 350 and moves the piston assembly 330 downward to the "mated" position shown in FIG. 4. In certain embodiments, the threshold pressure is associated with the spring 350. In certain embodiments, the threshold pressure is approximately the normal fluid pressure at or below a selected depth within a wellbore, e.g., 100 ft below the surface. In certain embodiments, the threshold pressure is selected to be within the range of pressure delivered by a fluid pump, e.g., pump 120 of FIG. 1.

Figure 5A:
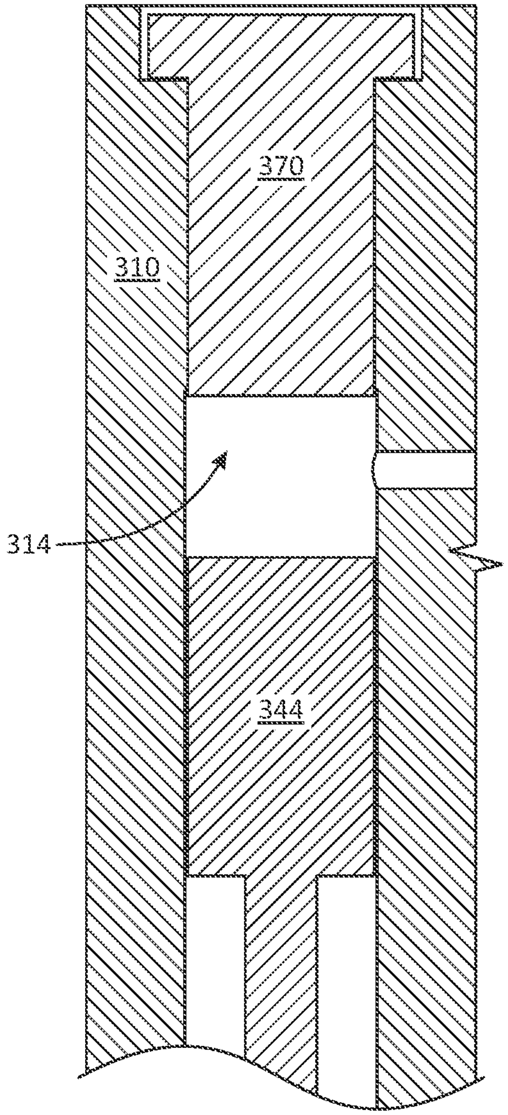
FIGS. 5A-5B illustrate an operational plug and a test plug, in accordance with various aspects of the subject technology.

FIG. 5A illustrates the operational plug 370 of FIG. 3, in accordance with various aspects of the subject technology. In certain embodiments, the plug 370 is threaded into the body 310 to close off the compartment 314, which was formed by a through-drill operation. In certain embodiments, the plug 370 comprises a seal disposed between the plug 370 and interior wall of compartment 314 to prevent the flow of fluid between the compartment 314 and the external wellbore environment. In certain embodiments, the plug 370 does not interact with the piston 344.

Figure 5B:
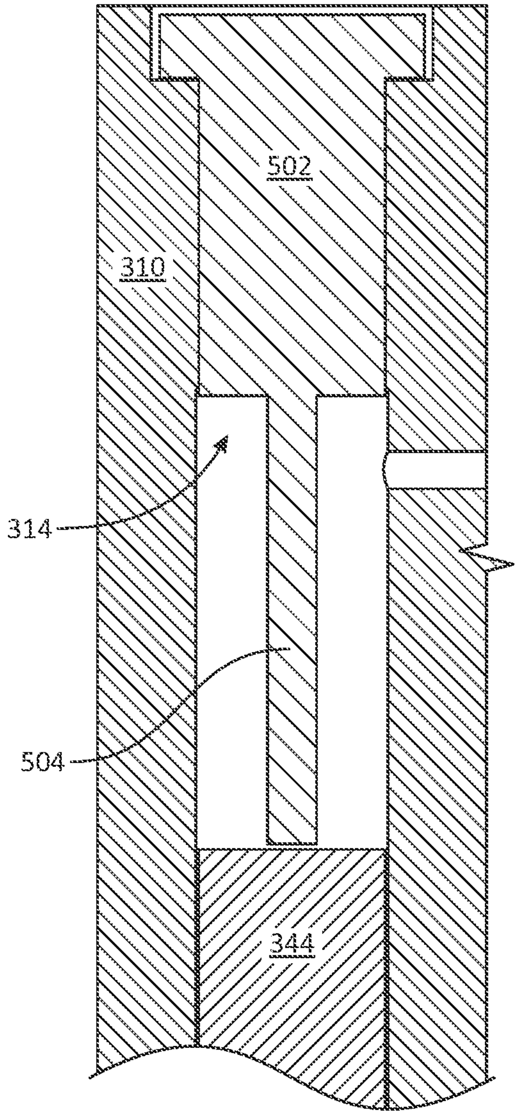

FIG. 5B illustrates a test plug 502, in accordance with various aspects of the subject technology. In addition to the features of plug 370, test plug 502 comprises a post 504 that extends into the compartment 314 and contacts the piston 314. The post 504 is configured such that the piston assembly 330 is displaced to the "mated" position of FIG. 5 when the test plug 502 is fully seated in housing 310. This connects power to the instrument and enables testing of the instrument while at the surface, i.e., in the absence of fluid and/or pressure above the threshold within the compartment 314.

Figure 6:
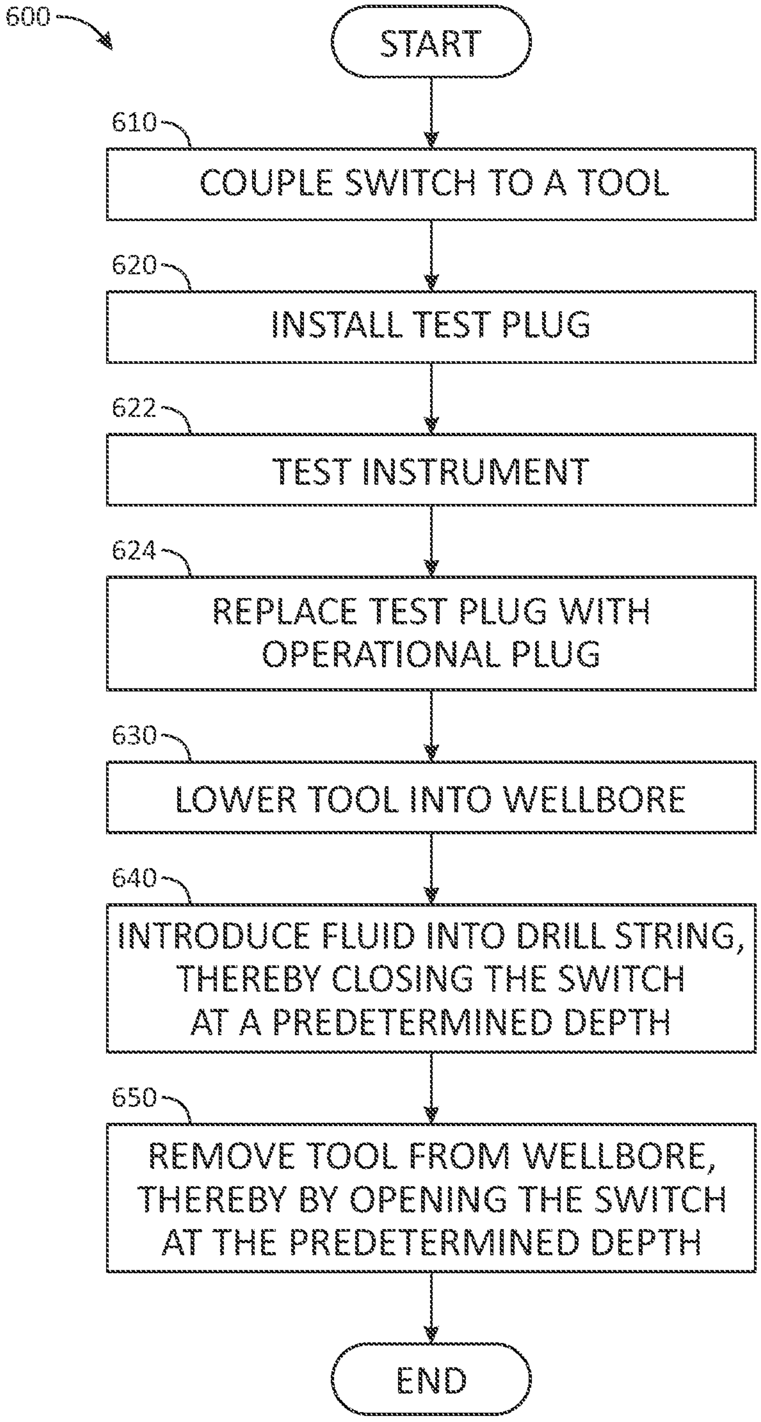
FIG. 6 is a flowchart of an example method of actuating a switch, in accordance with various aspects of the subject technology.

FIG. 6 is a flowchart 600 of an example method of actuating a switch 330, in accordance with various aspects of the subject technology. In step 610, the switch 330 is coupled to a tool that is to be lowered into a wellbore and electrically connected between a power source and an instrument.

Steps 620, 622, 624 are optional steps to test the switch and/or the coupled instrument and power source. In certain embodiments, this testing is performed in a workspace separate from the drill ring. In certain embodiments, this testing is performed while the tool is integrated into the drill string but before the tool is lowered into the wellbore.

Step 630 comprises lowering the tool into the wellbore. This includes coupling the tool to the drill string and adding sections of drill pipe to the drill string. In certain embodiments, the tool is connected to a wireline or tubing in place of a drill string. Step 640 introduces a fluid, e.g., mud, into the drill string. In certain embodiments, the fluid is introduced into the wellbore itself and the fluid enters the compartment from the external environment, e.g., by omitting plug 370 of FIG. 3. In the example embodiment, the static pressure of the fluid will create a pressure at or above an activation threshold at a predetermined depth, thus actuating the switch and mating connectors 334, 346 of FIG. 3. In certain embodiments, the fluid pressure at the switch is raised above the activation pressure by pressure provided by a pump on the surface.

Step 650 removes the tool from the wellbore. The static pressure of the fluid at the depth of the tool will diminish as the tool rises within the wellbore and fall below the activation threshold at approximately the predetermined depth. The switch will thus open before the tool reaches the surface.

In summary, the disclosed systems and methods conserve electrical power and enhance the safety of workers on a drill rig. The disclosed switch automatically closes and provides power to a connected instrument when the switch reaches a predetermined activation depth within the wellbore and automatically opens when the switch rises above the activation depth when the drill string is removed from the well bore. The switch also provides an ability to manually close the switch prior to being integrated into the drill string or lowered into the wellbore, thus enabling pre-operational testing to avoid a delay in operations at the drill rig.

For clarity of explanation, in some instances the present technology may be presented as including individual functional blocks including functional blocks comprising devices, device components, steps or routines in a method embodied in software, or combinations of hardware and software.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a non-volatile computer-readable memory, or other data storage medium, comprising program code including instructions that, when executed, performs one or more of the method, algorithms, and/or operations described above. The computer-readable data storage medium may form part of a computer program product, which may include packaging materials.

A computer-readable memory, as used herein, includes any type of storage media, e.g., a random access memory (RAM), a synchronous dynamic random access memory (SDRAM), a read-only memory (ROM), a non-volatile random access memory (NVRAM), an electrically erasable programmable read-only memory (EEPROM), a FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The phrase "urging an object" or similar means the application of a force to the object in a manner that will try and move the object toward a defined position or in a specific direction without implying that the object moves or that the object is restricted from moving in another direction, even backward with respect to the direction of the applied force.

Claim language reciting "an item" or similar language indicates and includes one or more than one of the items. For example, claim language reciting "a part" means one part or multiple parts.

Moreover, claim language reciting "at least one of" a set indicates that one member of the set or multiple members of the set satisfy the claim. For example, claim language reciting "at least one of A and B" means A, B, or A and B.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Statements of the disclosure include:

(A1) A switch, comprising: a body comprising a first connector, the body configured to be coupled to a compartment of a tool; a piston assembly movably coupled to the body and comprising: a second connector configured to mate with the first connector; and a piston configured to be movably disposed within the compartment; the piston assembly having a first position wherein the first and second connectors are separated and a second position wherein the first and second connectors are mated; a spring disposed between the body and the piston assembly and configured to apply a first force to the piston assembly that urges the piston assembly toward the first position; wherein introduction of a fluid at a pressure above a threshold into the compartment of the tool will cause the piston assembly to move to the second position.

(A2) The switch of A1, wherein: the piston is disposed external to the body; the piston assembly further comprises a cartridge disposed within the body; the cartridge is coupled to the piston; and the cartridge comprises the second connector.

(A3) The switch of A2, wherein the piston comprises a seal that prevents fluid from flowing past the piston within the compartment such that introduction of the fluid at a pressure above the threshold into the compartment of the tool applies a second force to the piston assembly that overcomes the first force applied to the piston assembly by the spring and moves the piston assembly to the second position.

(A4) The switch of A2, wherein: the switch is configured to be lowered into a wellbore and immersed in the fluid; the body comprises an internal space and a plug removably coupled to the body and configured to prevent that fluid from flowing into the internal space of the tool when coupled to the body; and the cartridge and spring are disposed within the internal space.

(A5) The switch of A1, wherein: the first connector comprises a first contact electrically coupled to a first wire and a second contact electrically coupled to a second wire; the first and second wires are electrically isolated when the piston assembly is in the first position; and the first and second wires are electrically connected when the piston assembly is in the second position.

(A6) The switch of A1, wherein a subsequent reduction of the pressure of the fluid in the compartment of the tool to a level below the threshold will cause the piston assembly to move to the first position.

(A7) The switch of A1, further comprising a test cap configured to move the piston assembly to the second position when the test plug is coupled to the compartment so as to enable testing of the switch without the fluid.

(B8) A system, comprising: a tool configured to be lowered into a wellbore and comprising; a housing; an internal passage within the housing and configured to accept a fluid having a pressure; and a compartment coupled to the housing and fluidically coupled to the internal passage; a switch comprising: a body configured to be coupled to the compartment of the tool, the body comprising a first connector; a piston assembly movably coupled to the body and comprising: a second connector configured to mate with the first connector; and a piston configured to be movably disposed within the compartment; the piston assembly having a first position wherein the first and second connectors are separated and a second position wherein the first and second connectors are mated; a spring disposed between the body and the piston assembly and configured to urge the piston assembly toward the first position; wherein introduction of a fluid at a pressure above a threshold into the internal passage of the tool will cause the piston assembly to move to the second position.

(B9) The system of B8, wherein: the piston is external to the body and movably disposed within the compartment; the piston assembly further comprises a cartridge disposed within the body; the cartridge is coupled to the piston; and the cartridge comprises the second connector.

(B10) The system of B9, wherein the piston comprises a seal that prevents fluid from flowing past the piston within the compartment such that introduction of the fluid at a pressure above the threshold into the compartment of the tool applies a second force to the piston assembly that overcomes the first force applied to the piston assembly by the spring and moves the piston assembly to the second position.

(B11) The system of B9, wherein: the switch is configured to be lowered into a wellbore and immersed in the fluid; the body comprises an internal space and a plug removably coupled to the body and configured to prevent that fluid from flowing into the internal space of the tool when coupled to the body; and the cartridge and spring are disposed within the internal space.

(B12) The system of B8, wherein: the first connector comprises a first contact electrically coupled to a first wire and a second contact electrically coupled to a second wire; the first and second wires are electrically isolated when the piston assembly is in the first position; and the first and second wires are electrically connected when the piston assembly is in the second position.

(B13) The system of B8, wherein a subsequent reduction of the pressure of the fluid in the internal passage of the tool to a level below the threshold will cause the piston assembly to move to the first position.

(B14) The system of B9, further comprising a test cap configured to move the piston assembly to the second position when the test plug is coupled to the compartment so as to enable testing of the switch without the fluid.

(C15) A method of actuating a switch, comprising steps: coupling a switch to a tool, wherein the tool comprises a compartment and the switch comprises: a body configured to be coupled to the compartment of the tool, the body comprising a first connector; and a piston assembly movably coupled to the body and comprising a second connector configured to mate with the first connector and a piston configured to be movably disposed within the compartment, the piston assembly having a first position wherein the first and second connectors are separated and a second position wherein the first and second connectors are mated; and lowering the tool into a wellbore; and introducing a fluid into the compartment at a pressure higher than an activation threshold, whereupon the fluid applies a force to the piston assembly that moves the piston assembly to the second position.

(C16) The method of C15, wherein: the switch further comprises a spring disposed between the body and the piston assembly and configured to apply a first force to the piston assembly that urges the piston assembly toward the first position; the fluid applies a second force to the piston assembly; and the piston assembly moves to the second position when the second force is greater than the first force.

(C17) The method of C16, wherein the fluid has a hydrostatic pressure at a predetermined activation depth that is approximately equal to the activation pressure such that the switch will automatically close when the tool reaches the activation depth.

(C18) The method of C17, wherein removing the tool from the wellbore will allow the piston assembly to move to the first position such that the switch will automatically open when the tool rises above the activation depth.

(C19) The method of C15, wherein the step of coupling the switch to the tool comprises electrically coupling an instrument to one of the first and second connectors and electrically coupling a power source to the other of the first and second connectors.

(C20) The method of C19, further comprising the steps: installing a test plug in the compartment of the tool, thereby connecting power from the power source to the instrument; testing the instrument; removing the test plug after completion of the testing; and installing a production plug in the compartment.

What is claimed is:

1. A switch, comprising:

a body comprising a first connector, the body configured to be coupled to a compartment of a tool, wherein the first connector includes a first contact and a second contact;

a piston assembly movably coupled to the body and comprising:

a second connector configured to mate with the first connector based on:

the first contact of the first connector mating with a first contact of the second connector, and the second contact of the first connector mating with a second contact of the second connector, wherein the first contact of the second connector is electrically connected to the second contact of the second connector; and a piston configured to be movably disposed within the compartment, wherein the piston assembly has a first position where the first and second connectors are separated and a second position where the first and second connectors are mated; and a spring disposed between the body and the piston assembly and configured to apply a first force to the piston assembly that urges the piston assembly toward the first position; wherein introduction of a fluid at a pressure above a threshold into the compartment of the tool forces the piston assembly to move to the second position.

2. The switch of claim 1, wherein:

the piston is disposed external to the body;

the piston assembly further comprises a cartridge disposed within the body;

the cartridge is coupled to the piston; and the cartridge comprises the second connector.

3. The switch of claim 2, wherein the piston includes a seal that prevents fluid from flowing past the piston within the compartment such that introduction of the fluid at a pressure above the threshold into the compartment of the tool applies a second force to the piston assembly that overcomes the first force applied to the piston assembly by the spring and moves the piston assembly to the second position.

4. The switch of claim 2, wherein:

the switch is configured to be lowered into a wellbore and immersed in the fluid;

the body comprises an internal space and a plug removably coupled to the body and configured to prevent that fluid from flowing into the internal space of the tool when coupled to the body; and the cartridge and spring are disposed within the internal space.

5. The switch of claim 1, wherein the first connector and the second connector mate when a protrusion fits within a receptacle and a linear alignment of the protrusion and the receptacle.

6. The switch of claim 5, wherein:

the first connector and the second connector are disposed in line with a pipe of a drill string when the piston assembly moves to the second position, and a subsequent reduction of the pressure of the fluid in the compartment of the tool to a level below the threshold will cause the piston assembly to move to the first position.

7. The switch of claim 1, further comprising a test plug configured to move the piston assembly to the second position when the test plug is coupled to the compartment so as to enable testing of the switch without the fluid.

8. A system, comprising:

a tool configured to be lowered into a wellbore and comprising;

a housing;

an internal passage within the housing and configured to accept a fluid having a pressure; and a compartment coupled to the housing and fluidically coupled to the internal passage;

a switch comprising:

a body configured to be coupled to the compartment of the tool, the body comprising a first connector, wherein the first connector includes a first contact and a second contact;

a piston assembly movably coupled to the body and comprising:

a second connector configured to mate with the first connector based on:

the first contact of the first connector mating with a first contact of the second connector, and the second contact of the first connector mating with a second contact of the second connector, wherein the first contact of the second connector is electrically connected to the second contact of the second connector; and a piston configured to be movably disposed within the compartment, wherein the piston assembly has a first position where the first and second connectors are separated and a second position where the first and second connectors are mated; and a spring disposed between the body and the piston assembly and configured to urge the piston assembly toward the first position; wherein introduction of a fluid at a pressure above a threshold into the internal passage of the tool forces the piston assembly to move to the second position.

9. The system of claim 8, wherein:

the piston is external to the body and movably disposed within the compartment;

the piston assembly further comprises a cartridge disposed within the body;

the cartridge is coupled to the piston; and the cartridge comprises the second connector.

10. The system of claim 9, wherein the piston includes a seal that prevents fluid from flowing past the piston within the compartment such that introduction of the fluid at a pressure above the threshold into the compartment of the tool applies a second force to the piston assembly that overcomes the first force applied to the piston assembly by the spring and moves the piston assembly to the second position.

11. The system of claim 9, wherein:

the switch is configured to be lowered into a wellbore and immersed in the fluid;

the body comprises an internal space and a plug removably coupled to the body and configured to prevent that fluid from flowing into the internal space of the tool when coupled to the body; and the cartridge and spring are disposed within the internal space.

12. The system of claim 8, wherein the first connector and the second connector mate when a protrusion fits within a receptacle and a linear alignment of the protrusion and the receptacle.

13. The system of claim 12, wherein:

the first connector and the second connector are disposed in line with a pipe of a drill string when the piston assembly moves to the second position, and a subsequent reduction of the pressure of the fluid in the internal passage of the tool to a level below the threshold will cause the piston assembly to move to the first position.

14. The system of claim 8, further comprising a test plug configured to move the piston assembly to the second position when the test plug is coupled to the compartment so as to enable testing of the switch without the fluid.

15. A method of actuating a switch, comprising steps:

coupling a switch to a tool, wherein the tool comprises a compartment and the switch comprises:

a body configured to be coupled to the compartment of the tool, the body comprising a first connector, wherein the first connector includes a first contact and a second contact; and a piston assembly movably coupled to the body and comprising:

a second connector configured to mate with the first connector based on:

the first contact of the first connector mating with a first contact of the second connector, and the second contact of the first connector mating with a second contact of the second connector, wherein the first contact of the second connector is electrically connected to the second contact of the second connector, and a piston configured to be movably disposed within the compartment, wherein the piston assembly has a first position where the first and second connectors are separated and a second position where the first and second connectors are mated; and lowering the tool into a wellbore; and introducing a fluid into the compartment at a pressure higher than an activation threshold, whereupon the fluid applies a force to the piston assembly that moves the piston assembly to the second position.

16. The method of claim 15, wherein:

the switch further comprises a spring disposed between the body and the piston assembly and configured to apply a first force to the piston assembly that urges the piston assembly toward the first position;

the fluid applies a second force to the piston assembly; and the piston assembly moves to the second position when the second force is greater than the first force.

17. The method of claim 16, wherein the fluid has a hydrostatic pressure at a predetermined activation depth that is approximately equal to the activation pressure such that the switch will automatically close when the tool reaches the activation depth.

18. The method of claim 17, wherein:

the first connector and the second connector are disposed in line with a pipe of a drill string when the piston assembly moves to the second position, and a subsequent reduction of the pressure of the fluid in the compartment of the tool to a level below the threshold will cause the piston assembly to move to the first position.

19. The method of claim 15, wherein the coupling the switch to the tool includes electrically coupling an instrument to one of the first and second connectors and electrically coupling a power source to the other of the first and second connectors.

20. The method of claim 19, further comprising the steps:

installing a test plug in the compartment of the tool, thereby connecting power from the power source to the instrument;

testing the instrument;

removing the test plug after completion of the testing; and installing a production plug in the compartment.

* * * * *